(12) United States Patent  
Ritchey

(10) Patent No.: US 7,441,354 B2  
(45) Date of Patent: Oct. 28, 2008

(54) TAG FOR LIVESTOCK

(75) Inventor: Eugene B. Ritchey, Brighton, CO (US)

(73) Assignee: Ritchey Manufacturing, Inc., Brighton, CO (US)

( * ) Notice: Subject to any disclaimer, the term of this patent is extended or adjusted under 35 U.S.C. 154(b) by 197 days.

(21) Appl. No.: 11/264,729

(22) Filed: Oct. 31, 2005

(65) Prior Publication Data

US 2006/0260157 A1    Nov. 23, 2006

Related U.S. Application Data

(63) Continuation-in-part of application No. 11/133,624, filed on May 19, 2005.

(51) Int. Cl.
    *G09F 3/00*    (2006.01)
(52) U.S. Cl. .......................... 40/300; 119/655; 119/858
(58) Field of Classification Search .................. 40/300, 40/304; 119/655, 858
    See application file for complete search history.

(56) References Cited

U.S. PATENT DOCUMENTS

| 1,347,868 | A | * | 7/1920 | Nichols ........................ 40/302 |
| 3,731,414 | A |   | 5/1973 | Murphy et al. |
| 4,021,952 | A | * | 5/1977 | Brierley ........................ 40/301 |
| 4,365,436 | A |   | 12/1982 | Ritchey |
| 4,366,777 | A |   | 1/1983 | Akhavein et al. |
| 4,428,327 | A |   | 1/1984 | Steckel |
| 4,633,606 | A |   | 1/1987 | Cohr |
| 4,741,117 | A |   | 5/1988 | Fearing |
| D296,943  | S |   | 7/1988 | Gardner |
| 4,958,452 | A |   | 9/1990 | Tate |
| 5,461,807 | A |   | 10/1995 | Johnson |
| 5,482,008 | A |   | 1/1996 | Stafford et al. |
| 5,768,813 | A |   | 6/1998 | Reboul et al. |
| 6,055,752 | A |   | 5/2000 | Ritchey |
| 6,145,225 | A | * | 11/2000 | Ritchey ........................ 40/301 |
| 6,968,639 | B2 |  | 11/2005 | Destoumieux |

FOREIGN PATENT DOCUMENTS

| EP | 0014584      | 8/1980 |
| EP | 0 407 853 A1 | 1/1991 |
| EP | 1060662      | 12/2000 |

(Continued)

OTHER PUBLICATIONS

Partial European Search Report for counterpart European Patent Application No. 06110393.3 dated Jul. 31, 2006.

(Continued)

*Primary Examiner*—Joanne Silbermann  
*Assistant Examiner*—Shin Kim  
(74) *Attorney, Agent, or Firm*—Sheridan Ross P.C.

(57) ABSTRACT

An identification tag is provided including a piercing element which captures a tissue sample of the animal during tagging. The tissue sample may be used to positively identify the animal for purposes of animal health tests, and the tissue sample may be further used to positively identify the animal tagged at all stages of the animal's life, as well as after the animal dies, by comparing the tissue sample with previously recorded DNA or other animal data. Visual indicia may also be incorporated on the tag, as well as electronic identification by use of a transponder.

10 Claims, 5 Drawing Sheets

FOREIGN PATENT DOCUMENTS

| | | |
|---|---|---|
| EP | 1060662 A1 * | 12/2000 |
| FR | 2 509 960 | 1/1983 |
| GB | 2 002 696 | 2/1979 |
| WO | 0239810 | 5/2002 |
| WO | 02078431 | 10/2002 |

OTHER PUBLICATIONS

Hasco Tag Company; page of website: http://www.hascotag.com/livestock.asp; printed Feb. 4, 2005; 1 page.

Examination Report for New Zealand Patent Application No. 545905 mailed Mar. 20, 2006.

* cited by examiner

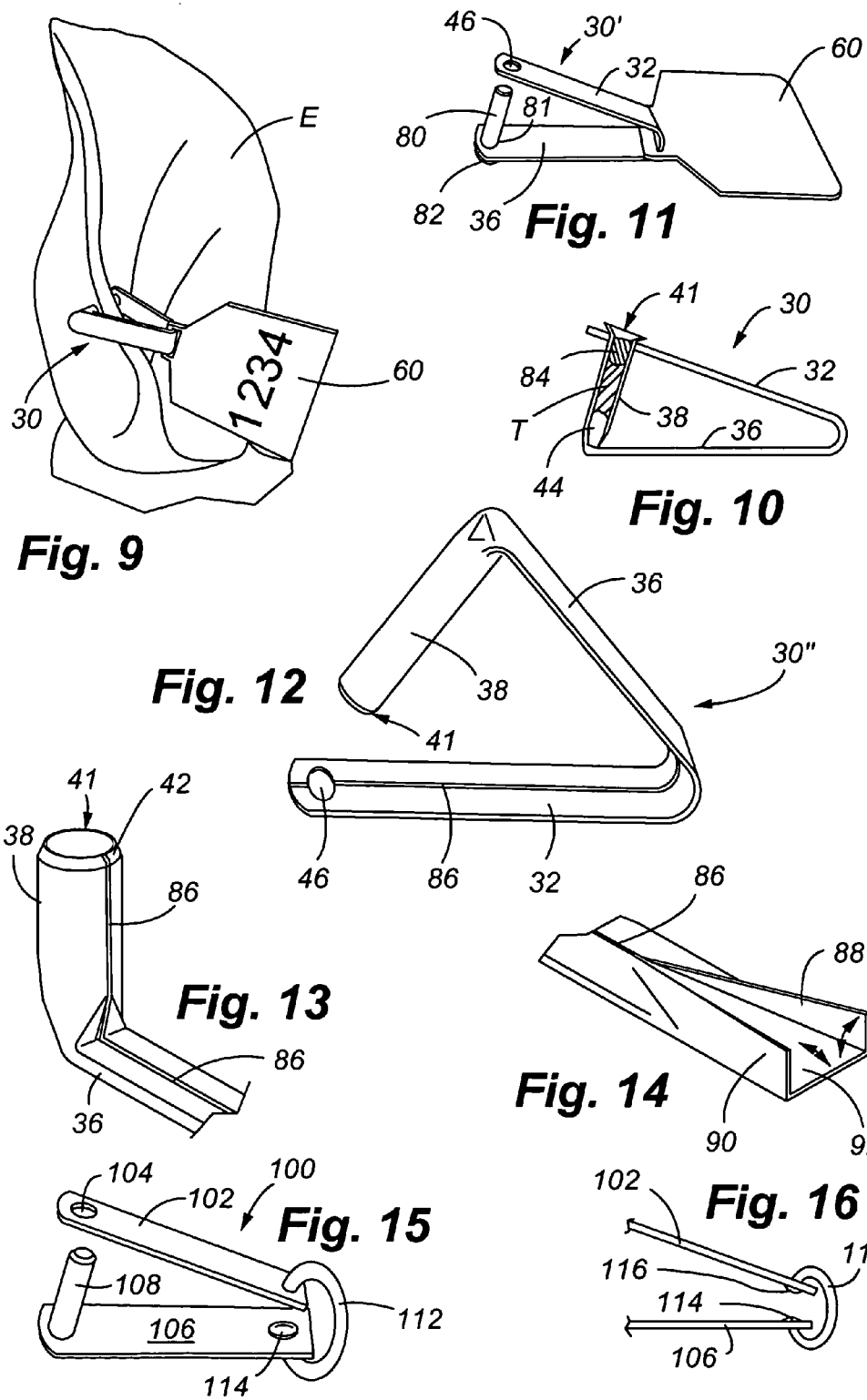

TAG FOR LIVESTOCK

CROSS REFERENCE TO RELATED APPLICATION

This application is a continuation-in-part application of co-pending application Ser. No. 11/133,624, filed May 19, 2005 and entitled "Tag for Livestock", the disclosure of which is incorporated herein by reference.

FIELD OF THE INVENTION

This invention relates to an identification device particularly suited for livestock, and more particularly, a livestock identification device in the form of an ear tag having the capability to store a tissue sample of the animal tagged.

BACKGROUND OF THE INVENTION

Livestock tags have been commonly used to identify livestock for many years. Traditionally, livestock tags were typically in the form of ear tags having indicia printed thereon for identifying the particular animal. More recently, technological advances in the identification of livestock has included the use of small transponders which are retained within the ear tag, and generate an identification signal in response to an electromagnetic interrogation field generated by a transmitter/receiver. Once interrogated, the transponder sends the identification signal, the signal is received, and recorded/processed to make identification of the particular animal. Transponders of this type may also be equipped with memory chips that may contain a wide array of information on the particular animal. Accordingly, identification of livestock has advanced so that a vast amount of information may be stored within the memory chip, and can be easily downloaded to the receiver. The use of transponder technology has greatly improved the capability to track and maintain records on each animal.

As time progresses, the trend in governmental control of livestock has been to require even greater information about each animal. Thus, identification requirements continue to increase in terms of the amount and type of data that must be maintained on each animal. Even with the use of transponders, the transponders may become separated from the animal, thus resulting in potential mis-identification of an animal, or at least delayed identification. In order to prevent mis-identification of an animal, redundant identification devices may be used on a particular animal, for example, use of a transponder and a visual tag.

Although advances have been made for livestock identification, the same general requirements still remain for use of devices that are attached to an animal's ear. For example, it is advantageous to have ear tags that are easily installed, minimize damage to the animal's ear, and can withstand the stresses that are placed upon the ear tag by the animal and the environment. It is also advantageous to have tags which can be installed by existing ear tag applicators/installers.

From time to time, it may also be necessary to obtain a tissue sample from the animal for analysis. For example, a tissue sample may be required for disease testing, DNA testing, or other purposes. Tissue sampling may become a more standard requirement in the future as government regulations become more stringent in terms of identifying every aspect of an animal, to include its lineage, and proof of its general state of health.

SUMMARY OF THE INVENTION

In accordance with the present invention, an identification device is provided including a piercing element that is used to penetrate the tissue of the animal for attachment. The configuration of the piercing element allows a user to obtain a tissue sample and to store the tissue sample within the piercing element. Alternatively, a tissue sampling member may be used in conjunction with the identification device wherein the sampling member captures and holds a tissue sample and the sampling member may be removed from the installed device. Optionally, the identification device may include a traditional panel with indicia thereon for identifying the particular animal. Alternatively, the identification device itself may include indicia printed or stamped thereon for identification of the animal.

In another preferred embodiment, an identification tag may incorporate a transponder that is formed integrally with a sleeve member that attaches to the identification device.

The piercing element is preferably cylindrical in shape, and having a sharpened or chamfered distal end. During installation, the distal end of the piercing element passes through an opening formed in the base of the identification device. As the distal tip passes through the opening, a slug of tissue is removed from the animal's ear or other body part, and the slug is captured within the hollow interior portion of the piercing element. A layer of wax or silicone may extend across the opening of the base, and this layer may serve as a sealer for maintaining the slug of tissue within the hollow interior of the piercing element. Alternatively, a tissue sampling member in the form of a cylindrical tube may be inserted coaxially within the piercing element. The piercing element has an opening sized to receive the cylindrical tube. After the tag has been installed on the animal, the cylindrical tube may be separated from the piercing element, and the tube contains the tissue sample.

The tag of the present invention may have indicia stamped or printed thereon to identify the particular animal to which the tag is applied. Alternatively, a panel having indicia printed or stamped thereon may be attached to the tag.

The particular details of the structure of the embodiments, along with other advantages of the invention, will become apparent to one skilled in the art in a review of the following description of the invention, taken in conjunction with the drawings and the claims.

BRIEF DESCRIPTION OF THE DRAWINGS

FIG. 9 illustrates an identification device or tag of the present invention secured to the ear of an animal;

FIG. 10 illustrates a cross-section of the tag showing a tissue sample captured by the tag;

FIG. 11 is a perspective view illustrating the tag of the present invention in a two-piece configuration;

FIG. 12 is another perspective view of the tag of the present invention showing the tag constructed of bended flat stock;

FIG. 13 is an enlarged portion of FIG. 12 more particularly illustrating the construction of FIG. 12 using bended flat stock;

FIG. 14 is another enlarged perspective view of a portion of FIG. 12 showing the bended flat stock construction;

FIG. 15 illustrates yet another embodiment of the present invention incorporating a flexible connecting member;

FIG. 16 is a partial elevation view further illustrating details of the flexible connecting member shown in FIG. 15;

DETAILED DESCRIPTION

Figure 1:
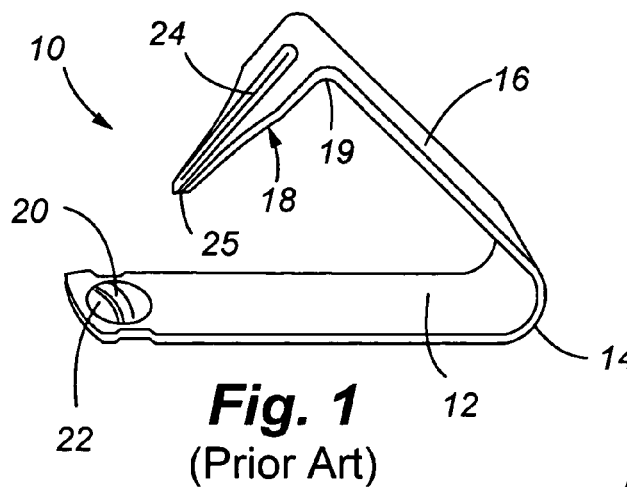
FIG. 1 is a perspective view of a prior art tag.
Figure 2:
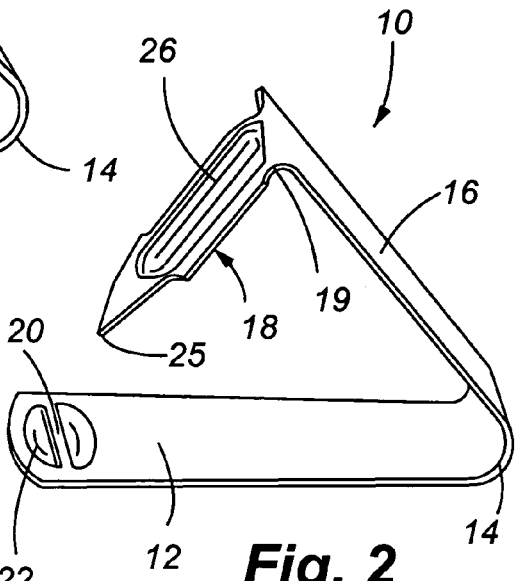
FIG. 2 is a perspective view of another prior art tag.

FIGS. 1 and 2 illustrate prior art livestock tags 10. These tags are manufactured and sold by Hasco Tag Company, and are currently marketed as a flat piercing post model (FIG. 1) and a round piercing post model (FIG. 2). These tags are self-piercing, self-locking, tamper resistant tags that are available for livestock, game and lab animals, poultry and turkey wing tagging, as well as other potential uses. The construction of these tags 10 include a base 12, a projection or arm 16 interconnected by the bend 14, and a piercing post 18 interconnected to the arm 16 by bend 19. The base 12 includes a bump or protrusion 22 formed in the base. In the positions shown in FIGS. 1 and 2, the protrusion 22 extends below the plane of the base. A web 20 traverses the opening created by the protrusion 22. An opening (not shown) is formed in the protrusion 22 just below the web 20, and the opening aligns with the web 20. In FIG. 1, the piercing post 18 has a generally flat shape 24, while FIG. 2 illustrates the piercing post 18 having a curved or rounded configuration 26. In operation, the piercing post 18 penetrates the ear or other body part of the animal to be tagged, and the distal tip 25 of the piercing post passes around the web 20 and through the opening formed in the protrusion 22. The piercing post is prevented from being disengaged by the web 20. This tag has proven to be an effective means of tagging animals; however, the particular construction of the present invention adds additional features not found in these prior art tags.

Figure 3:
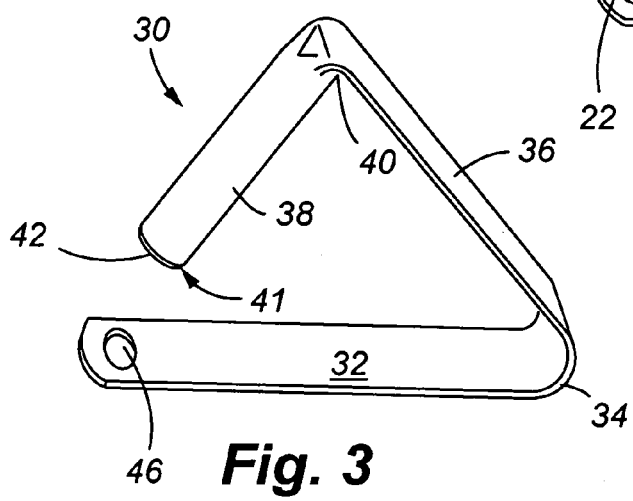
FIG. 3 is a perspective view illustrating the present invention in a first embodiment.

Referring to FIG. 3, a first embodiment of the identification device or tag 30 of the present invention is illustrated. The tag 30 includes a base 32, an arm or projection 36, a bend 34 interconnecting the base to the arm 36, a piercing element 38, and a bend 40 interconnecting the piercing element 38 with the arm 36. The piercing element 38 of the present invention is preferably cylindrical in shape, and the distal end 41 thereof is sharpened as by formation of a chamfer 42. Although preferably cylindrical in shape, the piercing element 38 may be another shape that at least includes some hollow interior portion that can be used to store a tissue sample, as discussed further below.

Figure 4:
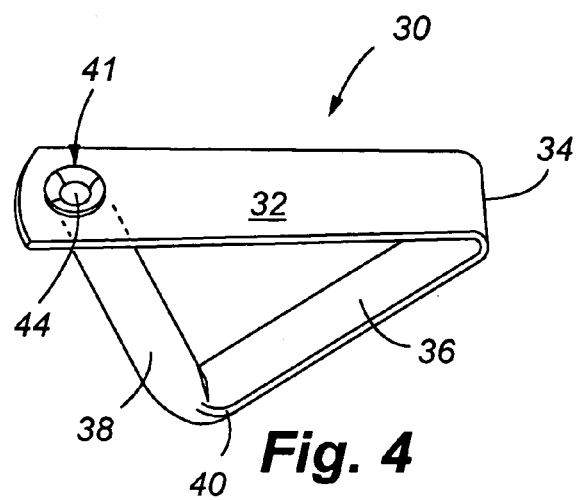
FIG. 4 is a reverse perspective view of the tag shown in FIG. 3.

Referring also to FIG. 4, in operation, the distal tip 41 of the piercing element 38 passes through an opening 46 formed on the base 32. The distal tip 41 is then flared or mushroomed, thereby preventing the tip from being pulled back through the opening 46. The distal tip 41 may be flared as by any conventional tool to include pliers, or ear tag installation tools having an anvil or flat engaging surface which can engage and flatten the distal tip.

Figure 5:
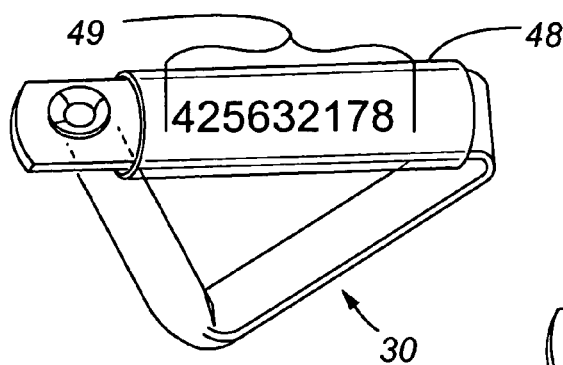
FIG. 5 illustrates a perspective view of another preferred embodiment of the present invention.

Referring to FIG. 5, the present invention is shown in a second embodiment wherein a flexible sleeve 48 is placed over the base 32. As shown, the sleeve 48 may include visual indicia 49 formed thereon for identifying the animal tag. The sleeve 48 may be made of a thermoplastic material, and may have a desired color.

Figure 6:
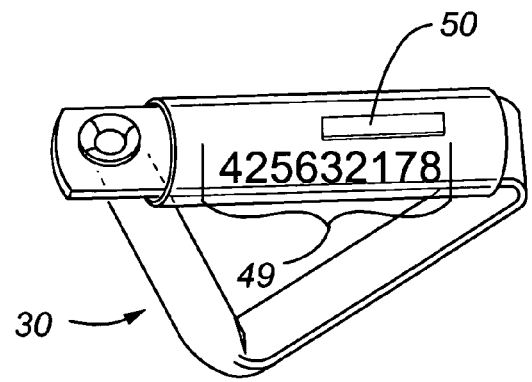
FIG. 6 illustrates a perspective view of yet another preferred embodiment wherein a transponder is incorporated within a sleeve attached to the tag.

Referring to FIG. 6, another embodiment is illustrated wherein a transponder 50 is incorporated on or into the sleeve 48. In this particular configuration, the transponder 50 represents those used in the livestock industry wherein the transponder can generate a signal when a transmitter/receiver device transmits a signal for interrogating the transponder. In this configuration, the sleeve 48 may still also include visual indicia 49. The transponder 50 may be attached to the sleeve 48 by epoxy, glue, resin, or some other attaching material. Alternatively, the transponder 50 may be molded within the sleeve 48 during manufacture of the sleeve. Those skilled in the art can envision other ways that the transponder 50 may be secured to the sleeve 48.

Figure 7:
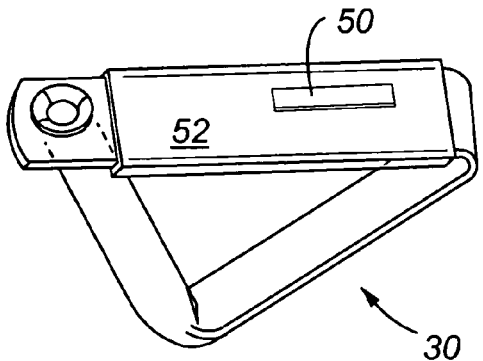
FIG. 7 illustrates the embodiment of FIG. 6 wherein the sleeve is formed in a rectangular shape.

FIG. 7 illustrates a sleeve 52 having a rectangular shape. In this shape, it may be less likely that the sleeve could get caught by brush, fencing or other objects that the animal may come into contact with. FIG. 7 also shows the transponder 50 attached to the sleeve 52. Like sleeve 50 shown in FIG. 6, the sleeve 52 may also include visual indicia (not shown) for identifying the particular animal.

Figure 8:
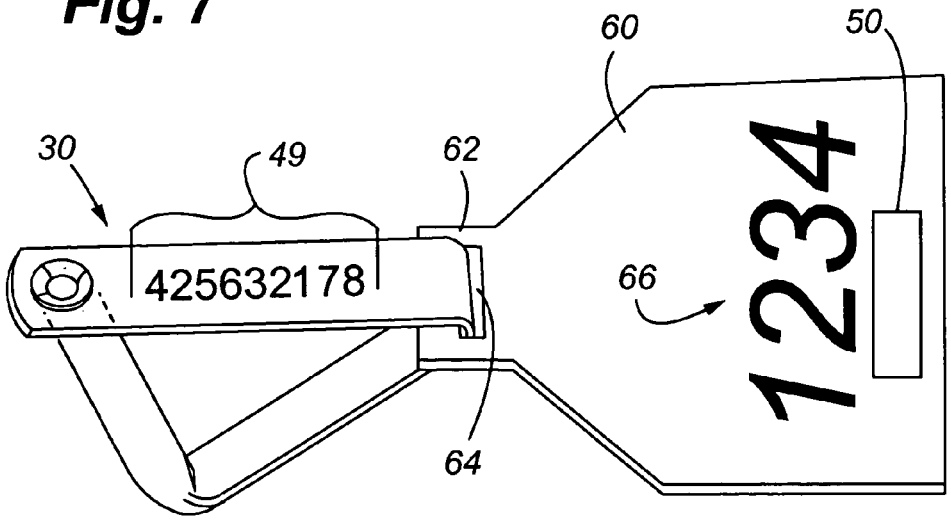
FIG. 8 is a perspective view of yet another embodiment of the present invention illustrating an identifying panel attached thereto.

FIG. 8 illustrates yet another embodiment of the present invention wherein a panel 60 is secured to the tag. The panel 60 includes a neck 62 and an opening 64 formed in the neck which receives the tag. One or more forms of indicia may be provided. The panel 60 may include indicia 66 having the appropriate numbers or code for identifying a particular animal. Optionally, the tag 30 shown in FIG. 8 may include additional means of identifying the animal in the form of indicia 49 formed directly on the tag, such as a stamped number or code. Further, the panel 60 may incorporate a transponder 50. One company currently incorporating transponders on panels is Cow Tek, Inc. of Brule, Nebr.

FIG. 9 illustrates the tag 30 of the present invention installed on the ear E of an animal. The piercing element 38 passes through the tissue of the ear and is locked to the base.

One manner of construction for the present invention includes the use of a tubular metal stock, such as tubular stainless steel. When using tubular metal stock, the base 32, bend 34, arm 36, and bend 40 would be flattened. However, the piercing element 38 would retain its tubular configuration.

In an alternative construction, as shown in FIG. 11, in lieu of using a single piece of tubular metal stock, the tag 30 of the present invention may be formed from two pieces. Accordingly, FIG. 11 shows the tag 30' wherein the base 32 and arm 36 are formed of a single piece of material, but the piercing element is a separate piece of material, shown as piercing element 80. The piercing element 80 has an enlarged head 82. The body, extension, or shaft portion of the piercing element 80 is inserted through an opening 81 formed in the arm 36. The head 82 is secured to the arm 36 as by welding, glue, or other appropriate means.

Referring to FIG. 10, a cross-section of the piercing element 38 is shown wherein the tissue sample T of the ear E is trapped within the hollow portion 44 of the piercing element 38. Optionally, a sealing element 84 may be placed within the hollow portion 44 of the piercing element, thereby preventing inadvertent removal of the tissue sample T. This sealant 84 may be wax, silicone, or other sealing material that can be manually inserted in the hollow portion 44 of the piercing element. Alternatively, the sealant 84 may be placed across the opening 46 of the base 32 so that when the piercing element 38 passes through the opening 46, the sealant 84 is dislodged and enters the hollow portion 44 of the piercing element. Positively securing a tissue sample T within the hollow portion 44 of the tag ultimately allows identification of the animal in the event the tag becomes separated from the animal. This is assumed, however, that there is some pre-existing data on the animal, such as DNA/prior tissue sampling that would enable one to compare the tissue sample with the existing data. Of course, the tissue sample T can also be used to check the health of the particular animal, as well as to check its lineage by DNA comparison. Because the tissue sample remains attached to the tag, there is less likelihood that the tissue sample can be confused with another animal.

FIGS. 12-14 illustrate the present invention made from a flat stock material that is bent in the shape to create the tag. More specifically, the tag 30" in accordance with the present invention is shown wherein a single piece of bended flat stock is used. In one preferred construction, the flat stock material has three distinct sections 88, 90, and 92, and a seam 86 extends along the base 32 and arm 36. As shown in FIG. 13, the piercing element 38 is simply formed in a tubular configuration. It may be more economical to use a single piece of bent flat stock as opposed to tubular stock.

FIGS. 15 and 16 illustrate yet another embodiment of the present invention. In this embodiment, the tag 100 includes a break-away or flexible connecting member 112 that interconnects a base 106 with an arm or projection 102. With the exception of the flexible connecting member, the tag of this embodiment functions in the same manner as the previous embodiments. Accordingly, the base 102 includes an opening 104 for receiving a piercing element 108. The purpose of the flexible connecting member 112 is to serve as a safety break in the event the tag becomes entangled. Thus, instead of the tag being separated from the animal's ear by a tear created through the portion of the animal's ear captured by the tag, the flexible connecting member 112 separates from attachment with the base 102 or the arm 106. The flexible connecting member 112 includes tabs 114 and 116 which secure the connecting member 112 to the base 102 and arm 106. The adjacent ends of the base 102 and arm 106 have openings to receive the tabs 114 and 116. With the application of enough force, the tabs 114 or 116 pass through the openings formed in the base or arm, thus separating the base from connection with the arm, and presumably freeing the entangled object from the tag. The flexible connecting member 112 may be made of a suitable rubber or plastic, and the tabs 114 and 116 can be sized with respect to the base and arm openings to enable the flexible connecting member to be separated with application of a maximum allowable force.

Figure 17:
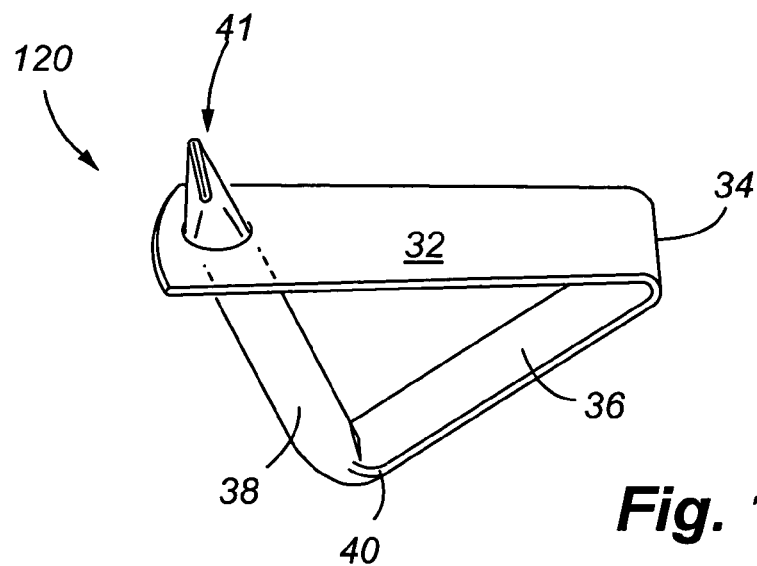
FIG. 17 illustrates yet another embodiment wherein the distal tip of the arm is crushed or flattened as opposed to being flared.

FIG. 17 illustrates yet another embodiment of the present invention. This tag 120 is identified with the same reference numbers as the first embodiment, those like elements bearing the same reference numbers. In lieu of providing a flared tip for the arm 38, the distal tip 41 of the arm is simply flattened or crushed. Once flattened or crushed, the distal tip 41 is prevented from passing back through the opening in base 32 since a lengthwise dimension of the crushed tip is greater than the diameter of the opening. Also, any tissue sample that may be taken when installing the tag is sealed within the arm 38, thereby eliminating the need for any type of sealant for capturing the sample within the arm.

Figure 18:
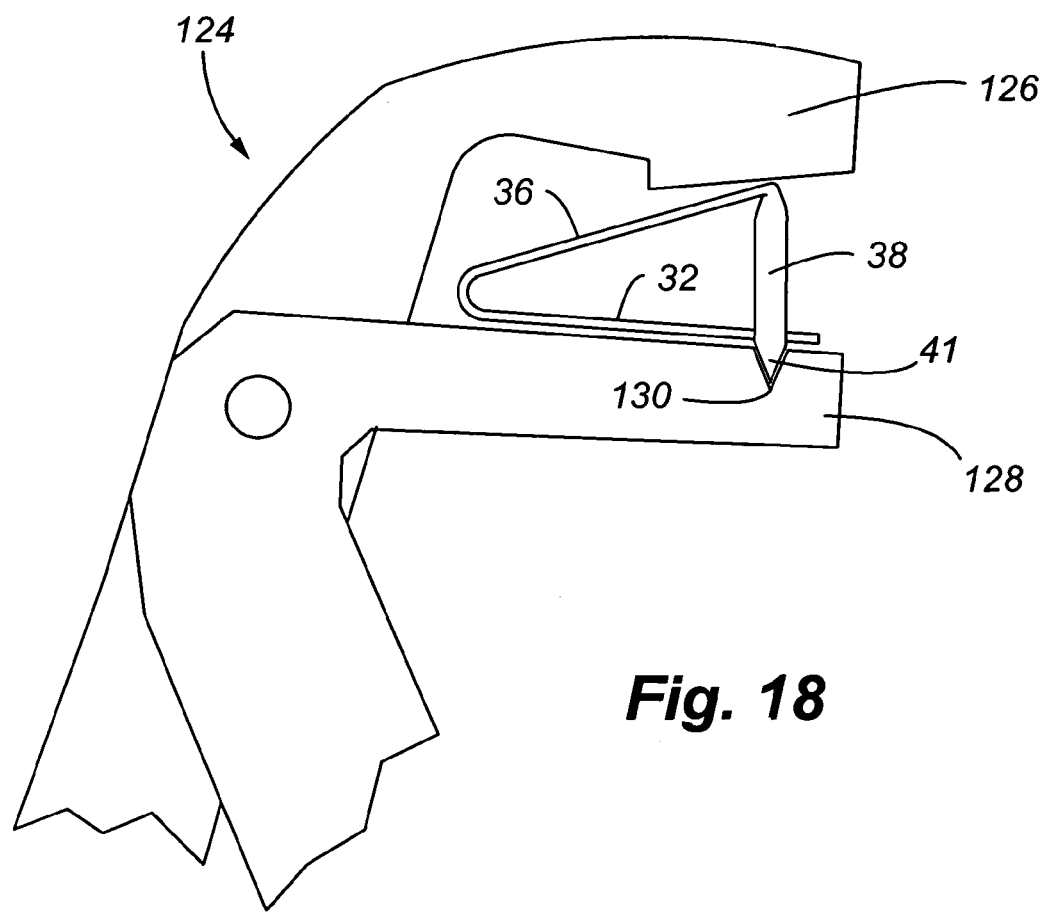
FIG. 18 shows an installation tool for attaching the tag of FIG. 17 and the manner by which the distal tip can be flattened.

FIG. 18 illustrates a common set of pliers 124 used as an installation tool for installing the tag of the present invention. As shown, the tag is positioned between an upper jaw 126 and a lower jaw 128 of the pliers. For clarity purposes, the ear of the animal is not illustrated. The animal's ear is first placed between the base 32 and the distal tip 41 of the arm 38. The jaws are moved toward one another causing the distal tip 41 to pass through the opening in the base 32. A slug of tissue is removed from the animal's ear and is then trapped within the hollow portion 44 of the arm 38. As the jaws continue to move toward one another, the distal tip 41 of the arm 38 passes into a v-shaped groove 130 formed in the lower jaw 128. As additional pressure is applied to the jaws, the normally circular shaped distal tip 41 is flattened or crushed within the v-shaped groove 138. Accordingly, the tissue sample is sealed within the hollow portion 44, and the tag is locked to the animal's ear.

Figure 19:
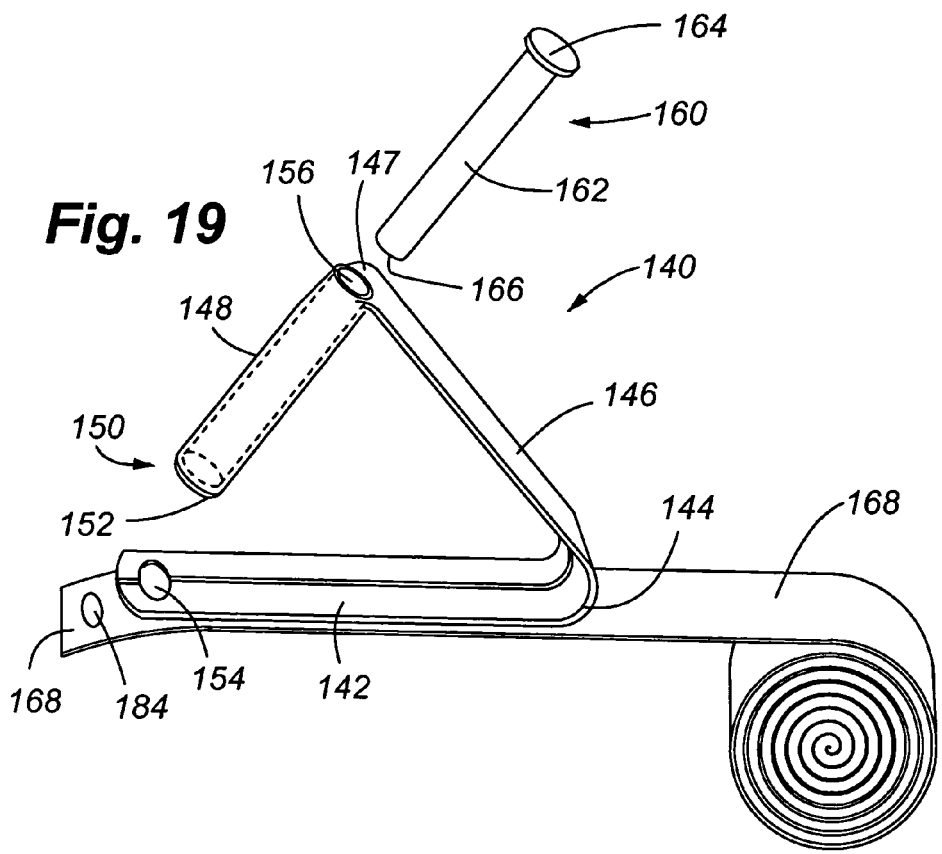
FIG. 19 illustrates yet another embodiment of the present invention.

FIG. 19 illustrates yet another preferred embodiment of the present invention. This embodiment is very similar to the embodiment shown in FIG. 12. More specifically, the tag 140 includes a base 142, a bend 144 interconnecting base 142 and projection 146, and a bend 147 interconnecting piercing element 148. Piercing element 148 includes a distal end 150 and a chamfer 152 formed thereon. An opening 154 is formed in the base 142 which receives the distal end 150 of the piercing element 148 when the tag is installed. FIG. 19 departs from the embodiment in FIG. 12 in that it also includes an opening 156 formed adjacent the bend 147. The opening 156 exposes the hollow cylindrical interior of the piercing element 148. A tissue sampling member 160 characterized by a cylindrical tube 162, a cap or stop 164, and an open end 166. The tissue sampling member 160 is inserted within the piercing element 148 through opening 156. The length of the member 160 is such that the open end 166 is positioned at the distal end 150, but does not extend beyond the chamfer 152. The tissue sampling member 160 is used to capture a tissue sample from the animal, the member 160 being separable from the tag 140 after the tag has been installed.

Figure 20:
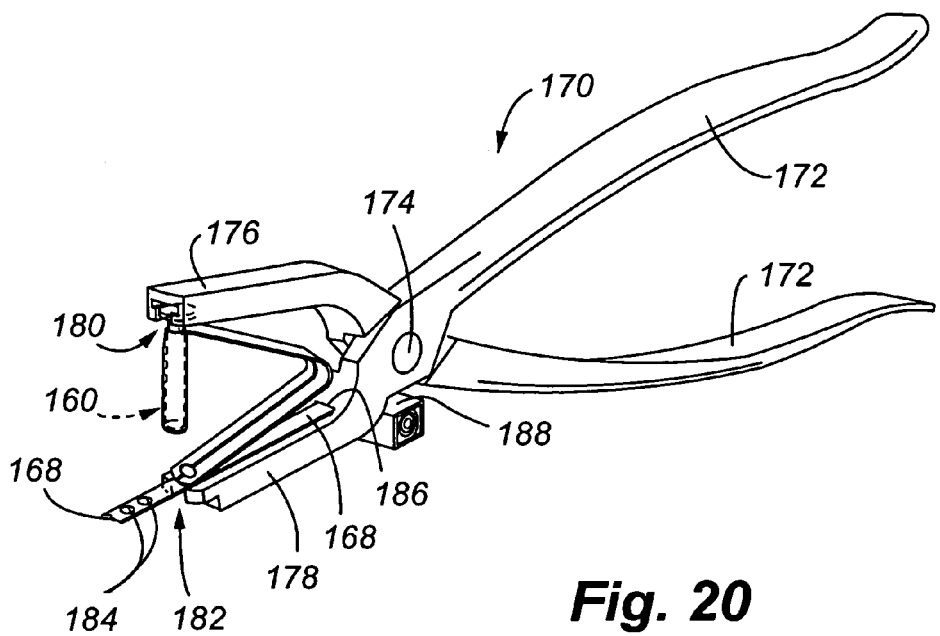
FIG. 20 illustrates the embodiment of FIG. 19 and an installation tool especially adapted for installing the identification device of FIG. 19.

Referring to FIG. 20, an applicator/installation tool 170 is shown which is especially adapted for installing the tag 140. The applicator includes a pair of handles 172, a center hinge 174, an upper jaw 176, and a lower jaw 178. The upper jaw 176 includes a t-shaped slot 180 formed on the distal tip thereof. The t-shaped slot is sized to receive the cap 164 and retains the tissue sampling member 160 as shown prior to installation of the tag. The lower jaw 178 includes a cutout 182 formed at the distal tip thereof which enables the piercing element 148 to travel beyond the plane of the lower jaw when the handles 172 are operated. Sealing material 168 is provided to seal the tissue sample within the hollow cylindrical tube 162. As shown in FIG. 20, the sealing material 168 may be retained within a cartridge 188 that attaches to the lower, rear surface of the lower jaw 178. The sealing material is routed through a dispensing slot 186, and the sealing material is advanced so that the sealing material is centered under the opening 154 and the base 142. The animal's ear is then placed between the upper and lower jaws, the handles 172 are operated, and a slug of the animal's tissue becomes lodged within the tube 162. The chamfer 152 of the piercing element 148 also perforates the sealing material 168, and the separated piece of sealing material 168 seals the slug of tissue within the tube 162. As the applicator 170 is used for subsequent operation, the sealing material 168 may be further advanced in preparation for installing another tag. The removed pieces of sealing material leave perforations 184 on the sealing material as shown. After the tag has been installed, the applicator tool is removed from the tag, and the user simply pulls on the cap 164 to remove the tissue sampling member 160 from the tag 140. Thus, the embodiment of FIGS. 19 and 20 enable the tissue sample to be taken at the time of tag installation, and then separated from the tag. If it were desired to keep the tissue sample with the tagged animal for a period of time, then a piece of adhesive tape could be used to keep the tissue sampling member secured to the tag itself if the user was not ready to separate the tissue sample from the tag. The embodiment of FIGS. 19 and 20 may also include the various means of identification discussed above with the previous embodiments, namely, a transponder 50 attached to a sleeve, a visual panel 60, and visual indicia 49 formed directly on the tag 140.

The advantages of the present invention are clear. An identification tag has been provided that allows the user to simultaneously obtain a tissue sample once the ear tag is installed. This tissue sample may be removed when necessary for testing, and in any event, identification of the animal to which the tag was secured remains with the tag throughout all phases of raising the animal.

If a prior DNA or tissue sampling was conducted on a particular animal and recorded, the captured tissue sample within the ear tag may be used as a means to confirm the identity of the animal that received the particular ear tag.

The tag of the present invention is also easily adapted to receive further identifying means to include a panel, a sleeve, and electronic identification in the form of a transponder that may be integrated within a sleeve. A break-away feature of the tag may be adopted in the form of a flexible connecting member.

This invention has been described in detail with reference to particular embodiments thereof, but it will be understood that various other modifications can be made within the spirit and scope of the invention as claimed.

What is claimed is:

1. An identification device comprising:
    a base having first and second ends, an opening formed adjacent said first end;
    an arm having first and second ends, said first end of said arm connected to said second end of said base;
    a piercing element having first and second ends, said first end of said piercing element connected to said second end of said arm, said piercing element having a hollow interior;
    a tissue sampling member having a hollow interior and placed coaxially within said piercing element at said first end of said piercing element; and
    wherein said piercing element pierces a tissue of an animal to be identified, said piercing element is secured to the base thereby securing the identification device to the animal, and the hollow interior of the tissue sampling member receives a piece of tissue of the animal as the identification device is installed.

2. A device, as claimed in claim 1, wherein:
    said tissue sampling member and said piercing element are made from tubular metal stock.

3. A device, as claimed in claim 1, wherein:
    said tissue sampling member includes a cap attached at one end thereof.

4. An identification device, as claimed in claim 1, wherein:
    said piercing element has a chamfered end that enhances the ability of the piercing element to penetrate the tissue.

5. An identification device, as claimed in claim 1, wherein:
    said base and said arm are substantially flat.

6. An identification device, as claimed in claim 1, wherein:
    at least one or more of said base, said arm, and said piercing element are made from tubular metal stock.

7. An identification device, as claimed in claim 1, wherein:
    said piercing element is secured with respect to said base by inserting said piercing element through said opening in said base, and then flaring a distal tip of said piercing element so that said distal tip has a diameter larger than a diameter of said opening.

8. An identification device, as claimed in claim 1, wherein:
    said identification device comprises a substantially triangular shape when installed.

9. An identification device, as claimed in claim 1, wherein:
    aid piercing element includes a distal tip having a flattened configuration when installed.

10. An identification device, as claimed in claim 1, wherein:
    said tissue sampling member includes a cap attached at one end thereof.

* * * * *